(12) United States Patent
Mizobuchi

(10) Patent No.: US 9,632,749 B2
(45) Date of Patent: *Apr. 25, 2017

(54) AUDIO RECORDING AND PLAYBACK DEVICE, AND POWER FEED METHOD FOR AUDIO RECORDING AND PLAYBACK DEVICE

(71) Applicant: Olympus Corporation, Hachioji-shi, Tokyo (JP)

(72) Inventor: Koji Mizobuchi, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/812,251

(22) Filed: Jul. 29, 2015

(65) Prior Publication Data
US 2015/0331667 A1 Nov. 19, 2015

Related U.S. Application Data

(63) Continuation of application No. 13/554,074, filed on Jul. 20, 2012, now Pat. No. 9,131,291.

(30) Foreign Application Priority Data

Aug. 1, 2011 (JP) .................................. 2011-168126

(51) Int. Cl.
*G06F 3/16* (2006.01)
*G05B 15/02* (2006.01)
*H04R 3/00* (2006.01)

(52) U.S. Cl.
CPC ............. *G06F 3/167* (2013.01); *G05B 15/02* (2013.01); *H04R 3/00* (2013.01)

(58) Field of Classification Search
CPC ............ G06F 3/167; G05B 15/02; H04R 3/00
See application file for complete search history.

(56) References Cited

U.S. PATENT DOCUMENTS

| 2006/0062406 A1* | 3/2006 | Kinoshita | H04R 3/00 381/113 |
| 2010/0290649 A1* | 11/2010 | Hibbing | H04R 3/00 381/174 |
| 2011/0142261 A1* | 6/2011 | Josefsson | H04R 3/00 381/107 |

FOREIGN PATENT DOCUMENTS

JP 09-074333 * 3/1997

* cited by examiner

*Primary Examiner* — Ping Lee
(74) *Attorney, Agent, or Firm* — John C. Pokotylo; Straub & Pokotylo

(57) ABSTRACT

An audio recording and playback device, of the present invention, capable of recording and playing back audio, comprises an audio input section for converting audio input during an audio recording operation into an electrical audio signal, a power feed section for carrying out power feeds to the audio input section by means of a balanced transmission line, an amplifier section for amplifying the audio signal, a boost section for generating a power feed voltage to be applied to the balanced transmission line and outputting to the power feed section, a output voltage changing section for carrying out control to vary the output voltage of the boost section, and a control section for controlling the power feed voltage of the power feed section by controlling the power feed section and the output voltage changing section.

20 Claims, 11 Drawing Sheets

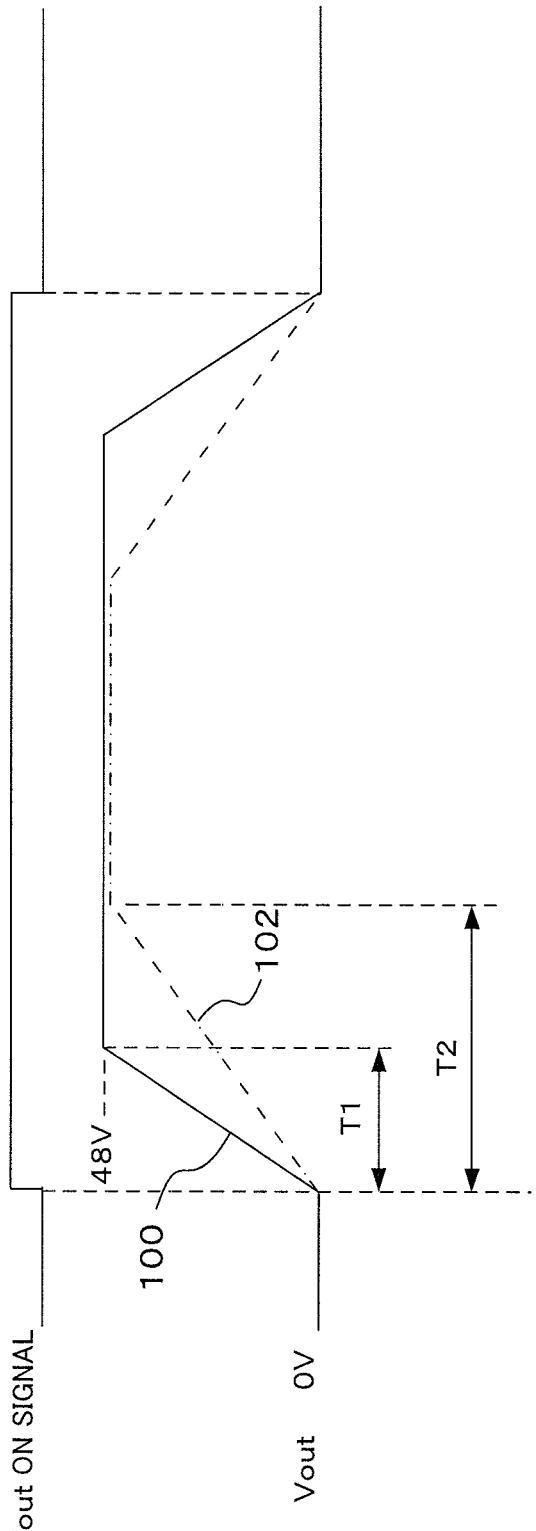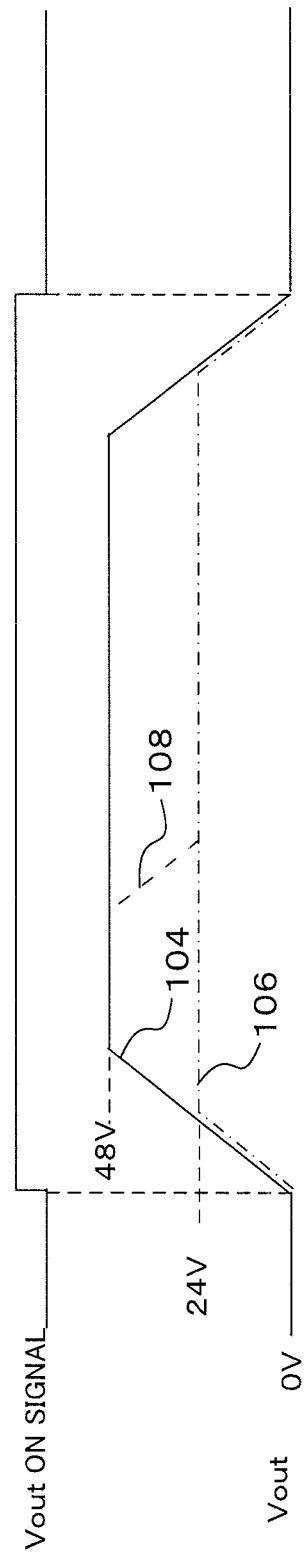
FIG. 10A
FIG. 10B

AUDIO RECORDING AND PLAYBACK DEVICE, AND POWER FEED METHOD FOR AUDIO RECORDING AND PLAYBACK DEVICE

RELATED APPLICATIONS

This application is a continuation application of U.S. patent application Ser. No. 13/554,074 (referred to as "the '074 application" and incorporated herein by reference), filed on Jul. 20, 2012, titled "AUDIO RECORDING AND PLYABACK DEVICE, AND POWER FEED METHOD FOR AUDIO RECORDING AND PLAYBACK DEVICE" and listing Koji MIZOBUCHI as the inventor, the '074 application claiming benefit of Japanese Application No. 2011-168126 filed in Japan on Aug. 1, 2011, the contents of which are incorporated by this reference.

BACKGROUND OF THE INVENTION

1. Field of the Invention

The present invention relates to an audio recording and playback device provided with a dedicated power feed function for an external microphone, and to a power feed method for the audio recording and playback device, 2. Description of the Related Art Portable audio recording and playback devices for converting an audio signal to digital data, storing in a rewritable storage medium such as flash memory, reading out this stored audio data and converting to analogue for playback (hereafter referred to as IC recorders) have been in practical use since the latter half of the 1990's, and a wide variety of IC recorders have been marketed to date.

On the other hand, there has been dramatic advancement in the increased capacity of flash memory, and with recent IC recorders high sound quality PCM recording has become mainstream. Furthermore, professional level IC recorders provided with a female terminal for connecting to an external microphone connection terminal (usually called an XLR connector or Cannon connector), having excellent noise tolerance that is particularly significant on original sound recording, are being produced.

Many external microphones are provided with a balanced cable made up of three conductors, namely HOT, COLD and GND. Also, one end of a balanced cable is provided with male terminals of an external microphone connection terminal. Of the above described three conductors, two of them, namely HOT and COLD, also function to feed power to the external microphone, and a power feed method that superimposes direct current on the two HOT and COLD conductors is generally called "phantom power". This phantom power conforms to JEITA RC-8162B (power supply methods for microphones) defined by the Japan Electronics and Information Technology Industries Association.

The female side where the above-described two conductors HOT and COLD are connected is provided with a high impedance differential input amplifier circuit (usually called an instrumentation amp). As a result, it becomes easy for large transient voltages in excess of the absolute maximum rating of the differential input amplifier circuit to occur at the time of starting or stopping power feed to the external microphone, due to sudden fluctuation in current flowing in the HOT and COLD conductors and in capacitors and resistors constituting the differential input amplifier.

Because this type of transient voltage has an adverse affect on devices, it has been proposed to control transient voltage. For example, with a signal amplifier disclosed in Japanese patent laid-open No. Hei 9-74333 (laid open Mar. 18, 1997), a passive circuit (CR integration circuit) is provided in an input circuit of a balanced microphone amplifier to which phantom power is connected, to control transient response voltage (also called click or pop noise).

SUMMARY OF THE INVENTION

The present invention has as its object to provide an audio recording and playback device that can optimize recording quality of a recording subject such as audio, and to a power feeding method for an audio recording and playback device.

An audio recording and playback device of the present invention, capable of recording and playing back audio, comprises an audio input section for converting audio input during an audio recording operation into an electrical audio signal, a power feed section for carrying out power feed to the audio input section by means of a balanced transmission line, an amplifier section for amplifying the audio signal, a boost section for generating a power feed voltage to be applied to the balanced transmission line and outputting to the power feed section, an output voltage changing section for carrying out control to vary the output voltage of the boost section, and a control section for controlling the power feed voltage of the power feed section by controlling the power feed section and the output voltage changing section.

Also, an audio recording and playback device of the present invention, capable of recording and playing back audio, comprises an audio input section for converting audio input during an audio recording operation into an electrical audio signal, a power feed section for carrying out power feed to the audio input section by means of a balanced transmission line, an amplifier section for amplifying the audio signal, a boost section for generating a power feed voltage to be applied to the balanced transmission line and outputting to the power feed section, an output current detection section for detecting output current output by the boost section to the power feed section, a output voltage changing section for carrying out control to vary the output voltage of the boost section, and a control section for controlling power feed voltage of the power feed section by controlling the power feed section and the output voltage changing section based on output of the output current detection section.

Also, a method of the present invention for feeding power to an audio input section of an audio recording and playback device, having a power feed section for carrying out power feed to the audio input section via a balanced transmission line and a boost section for generating a power feed voltage to be applied to the balance transmission line and outputting to the power feed section, involves bringing the output voltage of the boost section to a specified power feed voltage by causing a specified number of variations by a specified voltage every fixed interval, in response to an instruction as to whether or not the audio input sections is to be operated.

BRIEF DESCRIPTION OF THE DRAWINGS

FIG. 10A and FIG. 10B are time charts showing variation in output of power feed voltage Vout when executing voltage conversion processing, in the IC recorder of one embodiment and a modified example of the present invention.

DETAILED DESCRIPTION OF THE PREFERRED EMBODIMENTS

Figure 1:
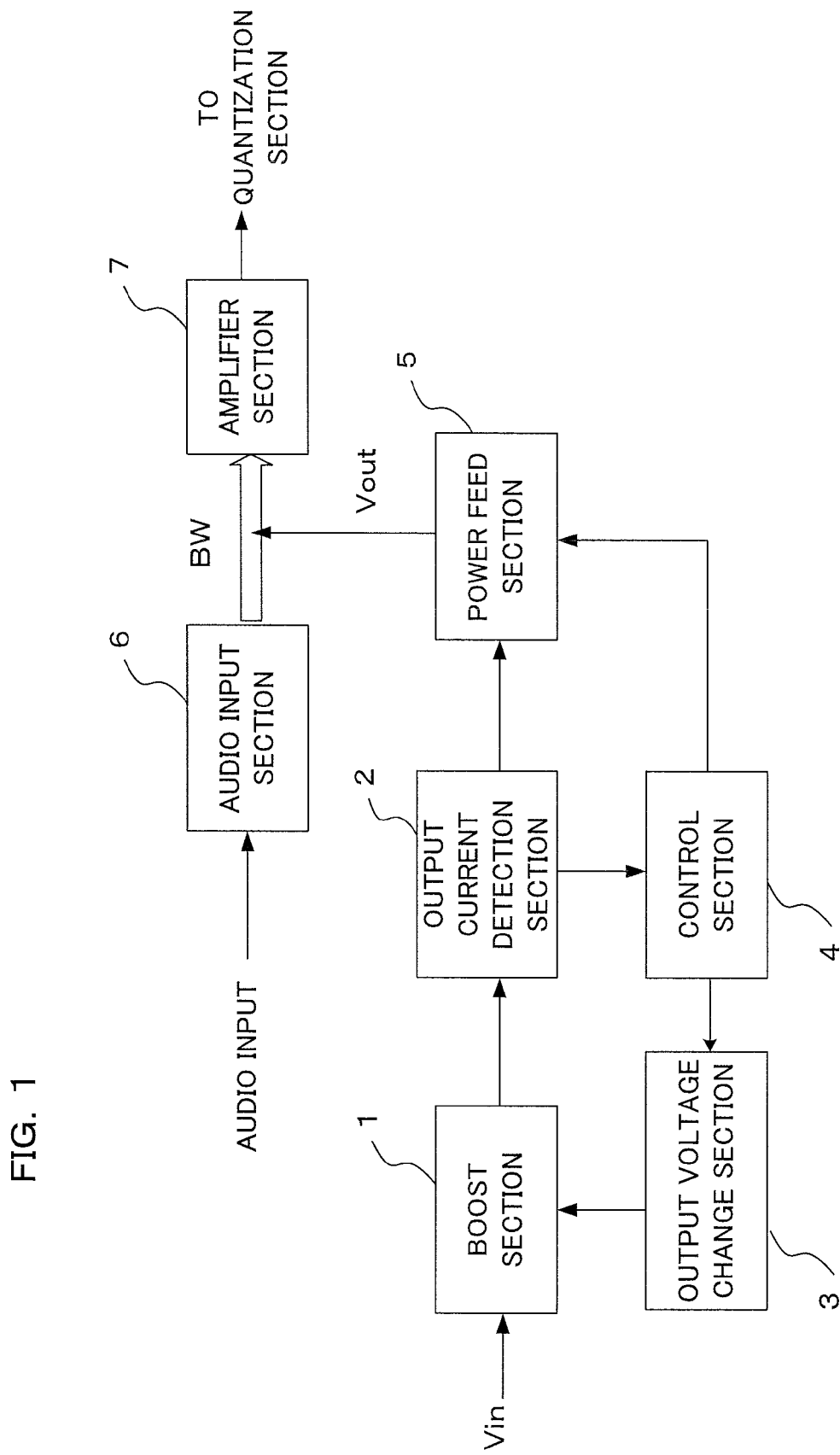
FIG. 1 is a block diagram showing an outline of a power feed function to an external microphone of an IC recorder relating to one embodiment of the present invention.

Preferred embodiments using IC recorder to which the present invention has been applied will be described in the following in accordance with the drawings. FIG. 1 is a block diagram showing an outline of a power feed function to an external microphone of an IC recorder relating to one embodiment of the present invention.

An audio input section 6 has a function to convert audio input during a recording operation into an electrical audio signal. An audio signal that has been converted by the audio input section 6 is output via a balanced transmission line BW to an amplifier section 7. A power feed section 5 has a function for carrying out power feed at a power feed voltage Vout to the audio input section 6 by means of the balanced transmission line BW. The amplifier section 7 amplifies the audio signal by a specified gain and outputs to a quantization section at a subsequent stage. The quantization section converts the audio signal to digital audio data.

A boost section 1 has a function to generate a power feed voltage Vout to be applied to the balanced transmission line BW, and output to the power feed section 5. Specifically, a low voltage Vin of a battery or the like, not shown, is boosted to the power feed voltage Vout to be applied to the balanced transmission line BW described previously, and output via an output current detection section 2 to the power feed section 5. An output voltage changing section 3 has an output connected to the boost section 1, and has a function to variably control the output voltage of the boost section 1.

A control section 4 controls power feed voltage Vout of the power feed section 5 by controlling the power feed section 5 and the output voltage changing section 3. Also, the control section 4 outputs a specified target voltage to the power feed section 5 within a specified time by controlling the output voltage changing section 3 to continuously increase or reduce the output voltage of the boost section 1 at roughly fixed intervals. Details of this power feed operation up to the target voltage will be described later using the flowcharts shown in FIG. 6 to FIG. 8.

The output current detection section 2 outputs the output voltage that is output by the boost section 1 as is to the power feed section 5, and at that time detects output current output to the power feed section 5. Specifically, the output current detection section 2 detects current that is circulating in the boost section 1 via the power feed section 5, balanced transmission line BW and audio input section 6.

Also, the fixed interval when the control section 4 continuously increases or decreases the output voltage of the boost section 1 is a minimum unit time used in output voltage change control of the output voltage changing section. The control section 4 changes the output voltage to bring it to a specified target voltage by continuously increasing or decreasing a minimum unit voltage when the specified target voltage is equally spread over a required time. Details of this change control up to the target voltage, will be described later in steps S93 and S97 of FIG. 7, step S113 of FIG. 8, and FIG. 10A.

The control section 4 also prohibits output voltage change control to the power feed section 5 by the output voltage changing section 3 during a recording operation. Details of this prohibition of output voltage change control will be described later in step S51 and step S69 of FIG. 5.

Next, the overall schematic structure of the IC recorder of this embodiment will be described using FIG. 2. A microphone (MIC) 20 corresponds to the audio input section 6 of FIG. 1, and converts audio to an analogue audio signal using a condenser mic etc. Output of the mic 20 is connected via a balanced cable 37 to a mic amp (AMP) 21 of an audio input section 33.

Within the audio input section 33, besides the previously described mic amp 21, there are provided a low pass filter (LPF) 22 that is connected to the mic amp 21, and an A/D converter (ADC) 23 that is connected to this low pass filter 22. The mic amp 21 has a function as the previously described amplifier section 7 and amplifies the analogue audio signal to a specified level, the low pass filter 22 cuts out unnecessary frequency components, and the A/D converter 23 converts an analogue audio signal from which the unnecessary frequency components have been cut to a digital audio signal (quantized data). In FIG. 2, an internal mic has been omitted, but in the case where an internal mic is provided output of the internal mic is connected so as to be directly input to the mic amp 21, not via the balanced cable 37.

Output of the A/D converter 23 is connected to a digital signal processing section (DSP) 28. The digital signal processing section 28 encodes (compresses) the digital audio signal to audio data of a specified encoding format in frame units. The digital signal processing section 28 and a system control section 29 are connected, and the encoded audio data is temporarily stored in buffer memory, not shown, of the system control section 29.

At the time of recording, the digital signal processing section 28 carries out encoding, and this encoded audio data is continuously temporarily stored in buffer memory. Audio data that has been stored in the buffer memory is sequentially stored in a storage section (memory) 32 using a FIFO (First In First Out) method. At the time of playback, the system control section 29 sequentially reads audio data from the storage section 32 to the buffer memory using a FIFO (First In First Out) method, and outputs audio data to the digital signal processing section 28. The digital signal processing section 28 decodes (expands) to digital audio data of a specified decoding format in frame units.

The digital signal processing section 28 is connected to a D/A converter (DAC) 24 within an audio output section 34.

Besides the D/A converter 24, a low pass filter 25 that is connected to the D/A converter 24, and a power amp (AMP) 26 that is connected to this low pass filter 25 are provided within the audio output section 34. The D/A converter 24 converts digital audio data that has been decoded by the digital signal processing section 28 into an analogue audio signal. The low pass filter 25 cuts an unnecessary frequency band. The power amp 26 amplifies the analogue audio signal from which the unnecessary frequency band has been cut, and outputs to a speaker 27. The speaker 27 converts the analogue audio signal to audio and outputs it.

The system control section 29 acting as the control section 4 is constituted by a CPU (central processing unit) and its peripheral circuits, and as well as the previously described digital signal processing section 28 and storage section 32, a display section 30, operating section 31, dedicated mic power supply section 35, and power feed section 36 are connected. An A/D converter (not shown) is provided inside the system control section 29, and carries out detection of a battery voltage Vin. The system control section 29 carries out overall control of the IC recorder in accordance with programs stored in a non-volatile memory such as flash memory.

The operating section 31 has various switches, such as a record switch (REC), a playback switch (PLAY), a stop switch (STOP), a fast-forward switch (FF), a rewind switch (REW), a menu switch (MENU), a hold switch (HOLD), and an external mic switching switch (MICPWR), arranged in functional groups. The external mic switching switch is provided on the IC recorder body, and is a switch for enabling operation of an external mic when an external mic (mic 20) is attached. Therefore, even if an external mic is attached, if the external mic switching switch is not operated recording using the external mic is not possible. The operating section 31 detects operating states of these switches, and detection signals from the operating section are output to the system control section 29. The system control section 29 executes specified sequences in accordance with the previous described programs if a detection signal is input.

The display section 30 displays an operating mode when a specified sequence is commenced as a result of operation of any one of the switches of the operating section 31, or displays the operating state after that. For example, in the case where the recording switch (REC) has been operated, the display section 30 displays the elapsed time of recording, recording time remaining, and file name etc. Also, in the case where the menu switch (MENU) has been operated, the display section 30 carries out display related to function selection, such as mic sensitivity (high/low), recording mode (standard/long), and alarm (on/off). Also, when the system control section 29 has a clock function, the display section 30 also carries out display of the current time and date.

The dedicated mic power supply section 35 corresponds to the boost section 1, output current detection section 2 and output voltage changing section 3 shown in FIG. 1, and boosts a battery voltage Vin, and changes this boosted voltage in accordance with an instruction from the system control section 29. The power feed section 36 corresponds to the power feed section 5 shown in FIG. 1, and applies a power feed voltage Vout to the mic 20 via the balanced cable 37.

Figure 3:
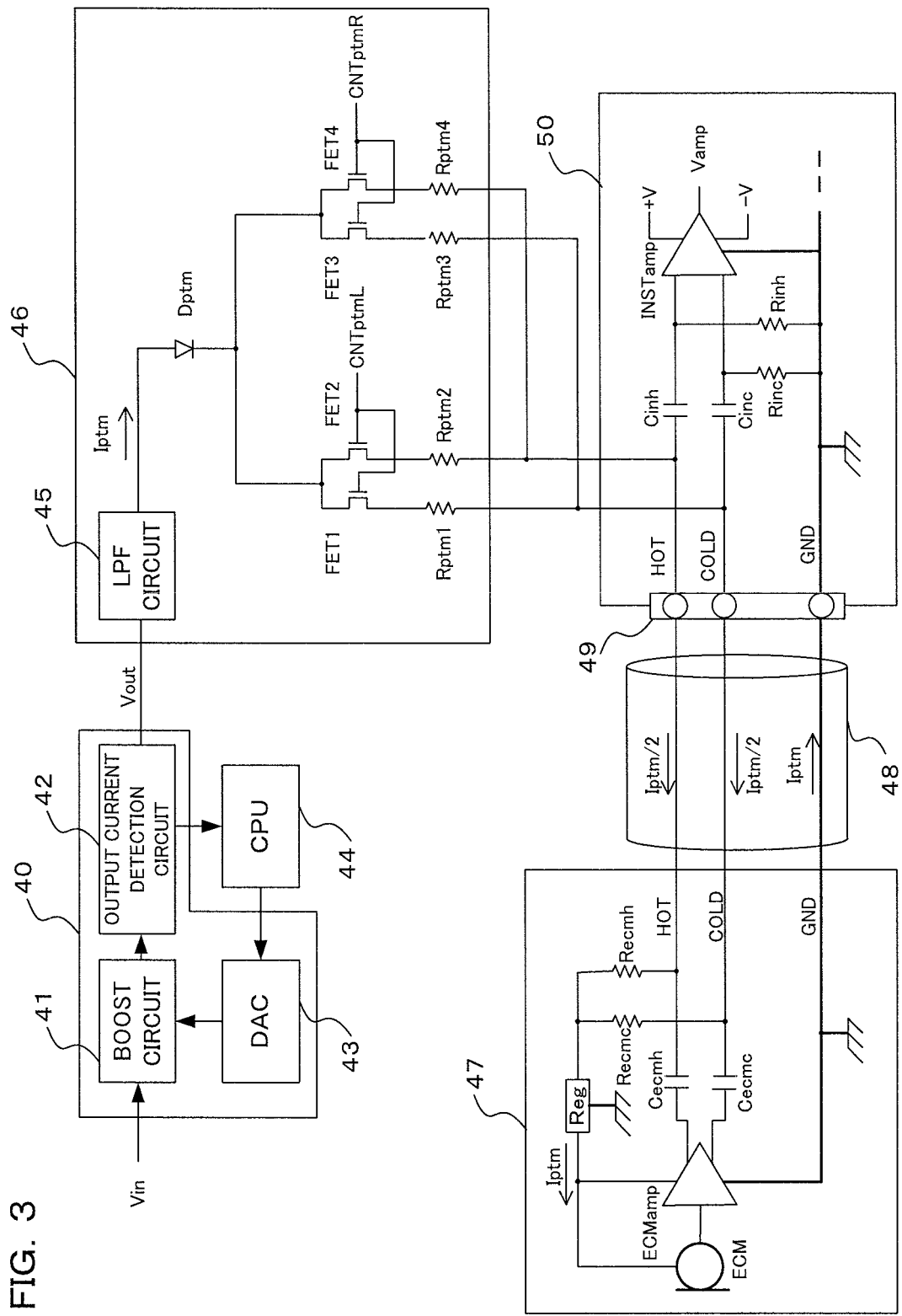
FIG. 3 is a functional block diagram corresponding to a microphone, microphone amp, dedicated microphone power supply section, power feed section, and a balanced cable of the IC recorder of one embodiment of the present invention.

The dedicated mic power supply section 35, power feed section 36, mic 20, mic amp 21, and balanced cable 37 will be described in more detail using the block diagrams shown in FIG. 3.

The external mic 47 corresponding to the mic 20 comprises a condenser mic unit ECM, a constant voltage element Reg, a positive side DC cut capacitor Cecmh, a negative side DC cut capacitor Cecmc, a positive side power feed resistor Recmh, a negative side power feed resister Recmc, and an amp ECMamp. An analogue audio signal output from the condenser mic unit ECM is amplified by the amp ECMamp, and output to each of the signal lines positive (HOT) and negative (COLD) as a GND reference balanced signal. This external mic 47 acts as the audio input section 6 of FIG. 1.

A mic cable 48 corresponding to the balanced cable 37 has 3 conductors, HOT, COLD and GND, with the respective HOT, COLD and GND terminals of the external mic 47 being connected to the respective HOT, COLD and GND terminals of a mic preamp 50.

Figure 2:
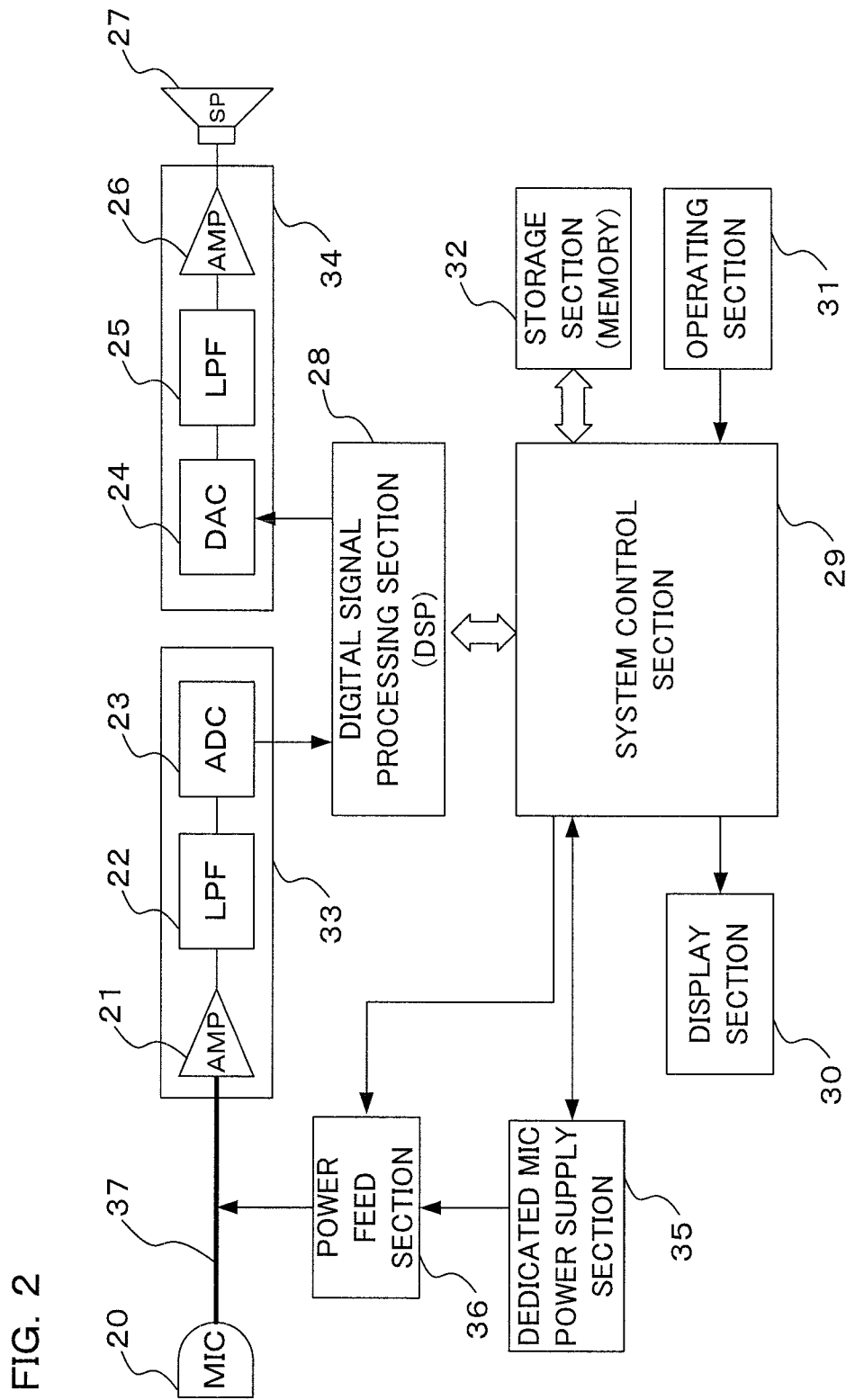
FIG. 2 is a block diagram showing the electrical structure of an IC recorder one embodiment of the present invention.

The mic preamp 50 corresponds to the mic amp 21 of FIG. 2, and acts as the amplifier section 7 of FIG. 1. The mic preamp 50 comprises an instrumentation amp INSTamp for providing both power supplies (V+, V−), a positive side DC cut capacitor Cinh, a negative side DC cut capacitor Cinc, a positive side input bias resistor Rinh, and a negative side input bias resistor Rinc. The analogue audio signal that has propagated along the 3 conductors of the mic cable 48 has each audio signal, positive (HOT) and negative (COLD), input to the instrumentation amp INSTamp by means of a connector 49, and is amplified by specified gain to Vamp. An XLR connector having excellent noise tolerance, for example, is used as the connector 49.

A power feed distribution circuit 46 that is equivalent to the power feed section 36 shown in FIG. 2, and acts as the power feed section 5 shown in FIG. 1, comprises a low pass filter (LPF) circuit 45, a diode Dptm, FET1-FET4, positive side power feed resisters Rptm2, Rptm4, and negative side power feed resisters Rptm1, Rptm3. The low pass filter circuit 45 effectively removes audio band switching noise that is superimposed on the power feed voltage Vout. The diode Dptm is for reverse current prevention when a high voltage is carelessly applied to positive (HOT) and negative (COLD) due to erroneous connection of an external device etc.

FET1-FET4 within the power feed distribution circuit 46 alternatively turn power feed to each of the signal lines positive (HOT) and negative (COLD) on or off. For example, if FET1 and FET2 are assigned to a 48V system and FET3 and FET 4 are assigned to a 24V system, it is possible to control 48V power feed with control signal CNTptmL. Similarly, it is possible to control the 24V power feed with control signal CNTptmR. In this way, in the case where a 48V system and a 24V system have been allocated, in accordance with the previously described standard JEITA RC-8162B, resistance values for each system become Rptm1=Rptm2=6.8 k•, Rptm3=Rptm4=1.2 k•.

A phantom power supply boost circuit 40 corresponding to the dedicated mic power supply section 35 shown in FIG. 2 comprises a boost circuit 41, a D/A converter (DAC) 43, and an output current detection circuit 42. The boost circuit 41 functions as the boost section 1 shown in FIG. 1, the D/A converter 43 functions as the output voltage changing section 3 shown in FIG. 1, and the output current detection circuit 42 functions as the output current detection section 2 shown in FIG. 1. Also, the CPU 44 that is equivalent to the system control section 29 shown in FIG. 2, and functions as the control section 4 shown in FIG. 1, is input with detection signals from the output current detection circuit 42 and outputs a boost voltage control signal to the D/A converter 43.

The boost circuit 41 is a generally available single stage boost circuit comprising a PWM controlled boost DC/DC converter IC (hereafter referred to as boost IC), and a power feed voltage Vout can be variably controlled in a range of Vin-48V in combination with the D/A converter 43. Specifically, the power feed voltage Vout can be gradually changed by injecting the output voltage of the D/A converter 43 that is controlled by the CPU 44 to one end of a bleeder resistor that has been connected to an FB (output voltage feedback) terminal, not shown, of the boost IC.

For example, when the D/A converter 43 has an 8 bit resolution, if adjustment amount and rate are set such that a minimum unit voltage is 0.3V/LSB and a minimum unit rate is 14 ms/LSB, then a required time from a boost start voltage (Vout≈Vin≈3.7V) until a boost target voltage (Vout=48V) is reached becomes about 2 seconds. The above-described value for the battery voltage Vin is for the case of a standard voltage of a lithium battery, but obviously batteries other than lithium batteries can also be used. In this specification, with respect to the D/A converter 43, the time required to change the least significant bit (LSB) of an input digital value is referred to as the minimum unit rate, but this can also be referred to as a minimum unit time.

If the power feed voltage is changed rapidly, it becomes easy for a large transient voltage to arise due to abrupt change in current that is flowing in capacitors and resistors connected to the input stage of the mic preamp 50. However, by causing the power feed voltage Vout to change gradually using the D/A converter 43 and the boost circuit 41, it is possible to effectively control transient response voltages (click or pop noise) arising at each input terminal of the instrumentation amp INSTamp. To reliably control transient response voltages, it is preferable to set the above-described minimum unit rate larger than a time constant of the positive side DC cut capacitor Cinh, negative side DC cut capacitor Cinc, positive side input bias resistor Rinh, and a negative side input bias resistor Rinc.

By arranging the output current detection circuit 42, which does not have a direct effect on improvement of the transient response characteristics, at a latter stage of the boost circuit 41, it is possible to detect consumption current Iptm of the external mic 47. Power consumption of the phantom power supply boost circuit 40 becomes large in proportion to power feed voltage Vout. It is therefore possible to improve usability, such as improved battery life, by carrying out power feed that is compatible with the consumption current Iptm of the external mic 47. When the consumption current Iptm of the external mic 47 is smaller than a predetermined specified value (when Iptm<7.0 mA, Vout=48V), the power feed voltage Vout is preferably switched to the 24V system. The above described specified value is a single reference value for general design (24V/3.4 k•) taking into consideration a margin when Vout=24V, and may be an appropriate numerical value determined so as to optimize battery life conditions for each system.

Next, operation of an IC recorder that is one embodiment of the present invention will be described using the flowcharts shown in FIG. 4 to FIG. 8. These flowcharts (also including the flow shown in FIG. 9 and FIG. 11 of a modified example of this embodiment) are executed by the system control section 29 (CPU 44) in accordance with programs stored in non-volatile memory.

If a power supply of the IC recorder is placed in the on state, the system control section 29 carries out specified initialization setting (S1), and starts a timer (S3). As will be described later, in steps S21 and S41, after the lapse of a specified time the IC recorder enters a standby mode from normal operating mode. In step S3, a timer for measuring the specified time is started.

If the timer is started, a normal operating mode is entered, and switch detection operations shown in steps S5-S19 are carried out based on detection signals from the operating section 31. Specifically, whether or not the various switches of the operating section 31 have been operated and switched on is determined in the order of the record switch (REC) (S5), playback switch (PLAY) (S7), fast-forward switch (FF) (S9), rewind switch (REW) (S11), stop switch (STOP) (S13), menu switch (MENU) (S15), erase switch (ERASE) (S17), and external microphone switching switch (MICPWR) (S19).

If the result of determination in step S5 is that the record switch is on, recording processing is next carried out (S23). Also, if the result of determination in step S7 is that the playback switch is on, playback processing is carried out (S25). Also, if the result of determination in step S9 is that the fast-forward switch is on, fast-forward processing is carried out (S27). Also, if the result of determination in step S11 is that the rewind switch is on, rewind processing is carried out (S29).

Also, if the result of determination in step S13 is that the stop switch is on, stop processing is carried out (S31). If the result of determination in step S15 is that the menu switch is on, menu change processing is carried out (S33). Also, if the result of determination in step S17 is that the erase switch is on, erase processing is carried out (S35). If the result of determination in step S19 is that the external microphone switching switch is on, mic power feed processing is carried out (S37).

Once each of the processes in the above-described steps S23-S37 have been carried out, the timer that started the timing operation in step S3 is restarted (S39) and processing returns to step S5. Each of the processes in steps S23-S37 are known processes, and so detailed description is omitted. The recording processing of step S23 will be described later using FIG. 5, and the mic power feed processing of step S37 will be described later using FIG. 6.

If the results of switch state determination in steps S5-S19 are that all the switches are off, it is next determined whether or not the timer has expired (S21). As described previously, if the timer was started in step S3, and various processes were executed in steps S23-S37, the timer is restarted in step S39. If a predetermined time has elapsed from start of the timer, or, if the timer has been restarted after having been started, a specified time has elapsed from the restart, it is determined that the timer has expired. If the result of this determination is that the timer has not elapsed, step S5 is returned to and normal operation continues.

On the other hand, if the result of determination in step S19 is that the timer has expired, standby-mode is entered (S41). If standby mode is entered a low consumption current operation comes into effect. Specifically, power supply for the audio input section 33, audio output section 34, digital signal processing section 28, display section 30, storage section 32, dedicated mic power supply section 35, and power feed section 36 in FIG. 2 is disconnected, or a deselect signal is output from the system control section 29 to chip enable terminals provided on ICs, not shown, that constitute each block. These processes result in a low consumption current state.

When the standby mode has been entered and the low consumption current state is in effect, the CPU 44 within the system control section 29 switches its own operating clock to a low speed clock of minimum consumption current, to also enter a low consumption current state. Depending on the situation, the operating clock may be switched from a main clock (for example, 12,000 MHz) to a sub clock (for example, 32.768 MHz), and after that the main clock completely is stopped until a switch input is detected.

If any switch is operated during standby mode, standby mode is released, processing returns to step S3, and normal operation is resumed.

Figure 4:
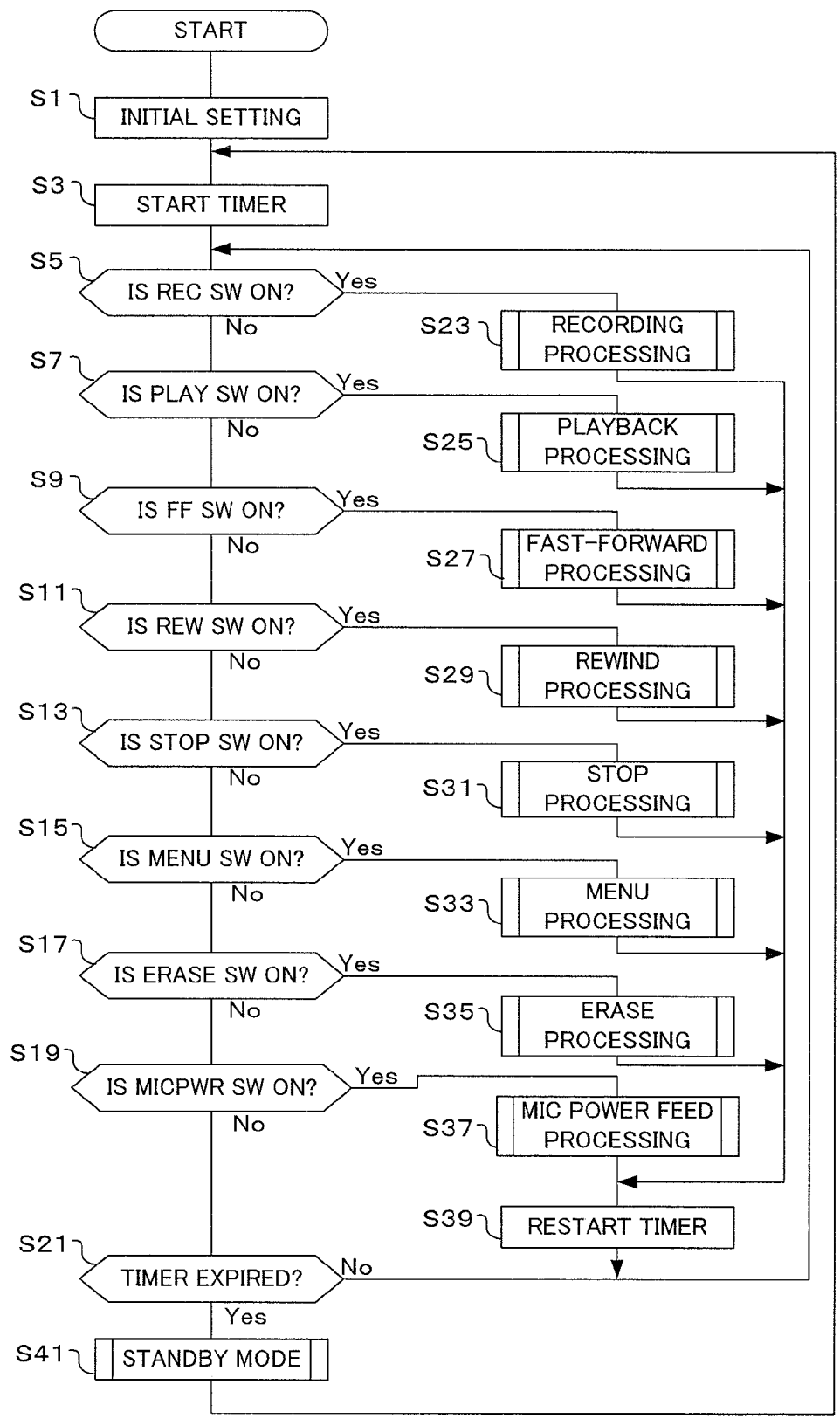
FIG. 4 is a flowchart showing overall operation of the IC recorder of one embodiment of the present invention.
Figure 5:
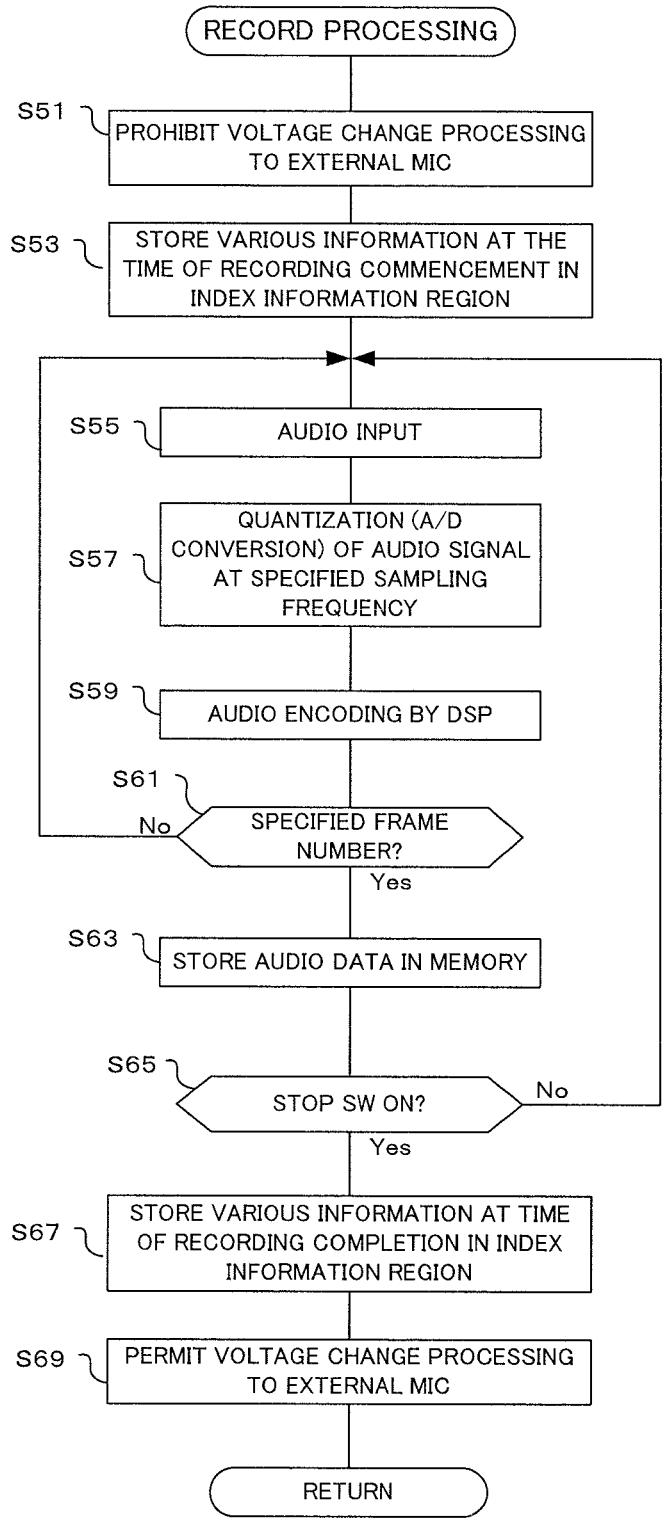
FIG. 5 is a flowchart showing operation of recording processing of the IC recorder of one embodiment of the present invention.

Next, the recording processing of step S23 (refer to FIG. 4) will be described using the flowchart shown in FIG. 5 and with reference to FIG. 2-FIG. 4.

If recording processing is commenced, first, voltage change processing to an external mic is prohibited (S51). During recording, if an external mic switching switch is operated and power is fed to an external mic, a power feed voltage Vout is applied to the mic 20 that is an external mic. With this embodiment, a voltage is incrementally boosted by the dedicated mic power supply section 35, as was described previously, the power feed voltage Vout is applied to a mic preamp 21, and pop noise is repressed. However, at the time of recording, in order to minimize noise, voltage change processing is not carried out.

If voltage change processing to the external mic is prohibited, next, various information at the time of commencing the recording is stored in an index information region (S53). Here, information such as mic sensitivity (high/low), recording mode (standard/long), file number, record monitor (on/off) and audio data storage region start address for storing audio data, are stored Once various information has been stored, audio input is next carried out (S55). Here, audio is input from the mic 20, and an analogue audio signal is acquired. Once audio input has been carried out, next, quantization (A/D conversion) of an audio signal is carried out at specified sampling frequency (S57). Here, an input analogue audio signal is quantized (A/D converted) by the A/D converter 23 in synchronization with a specified sampling frequency.

If quantization of the audio signal has been carried out, next audio encoding is carried out by the digital signal processing section (DSP) 28 (S59). Encoding of audio data itself is carried out in frame units. Encoded audio data is sequentially stored in buffer memory, not shown, within the system control section 29.

Once audio encoding has been carried out it is next determined whether or not a specified frame number has been reached (S61). Here, it is determined whether or not the frame number that was encoded in step S59 has reached a specified number. For example, in the case of writing audio data resulting from encoding an audio signal of 10 bits/frame up to 4 bits/frame into the storage section 32 in 512 byte units, the specified frame number becomes 1024. If the result of this determination is that the specified frame has not been reached, processing returns to step S55 and this processing is continuously repeated until the specified frame number is reached.

If the result of determination in step S61 is that the encoded audio data has reached the specified frame number, the audio data is next stored in memory (S63). Here, encoded audio data is stored by sequentially writing from an audio data storage region start address, not shown, of the storage section 32.

If the audio data has been stored in memory, It is next determined whether or not the stop switch (STOP) is on (S65). Here, whether or not the stop switch is in the on state is determined based on a detection signal from the operating section 31. If the result of this determination is that the stop switch is off, step S55 is returned to and the recording processing in steps S55-S59 continues.

If the result of determination in step S65 is that the stop switch is on, recording processing is stopped, and various information at the time the recording was stopped is stored in an index information region (S67). Next, voltage change processing to the external mic is permitted (S69). As was described previously, in step S51 voltage change processing to the external mic was prohibited, and since recording completion processing was carried out in step S67, after that voltage change processing to the external mic is permitted. Once voltage change processing to the external mic has been permitted the original processing flow is returned to.

Figure 6:
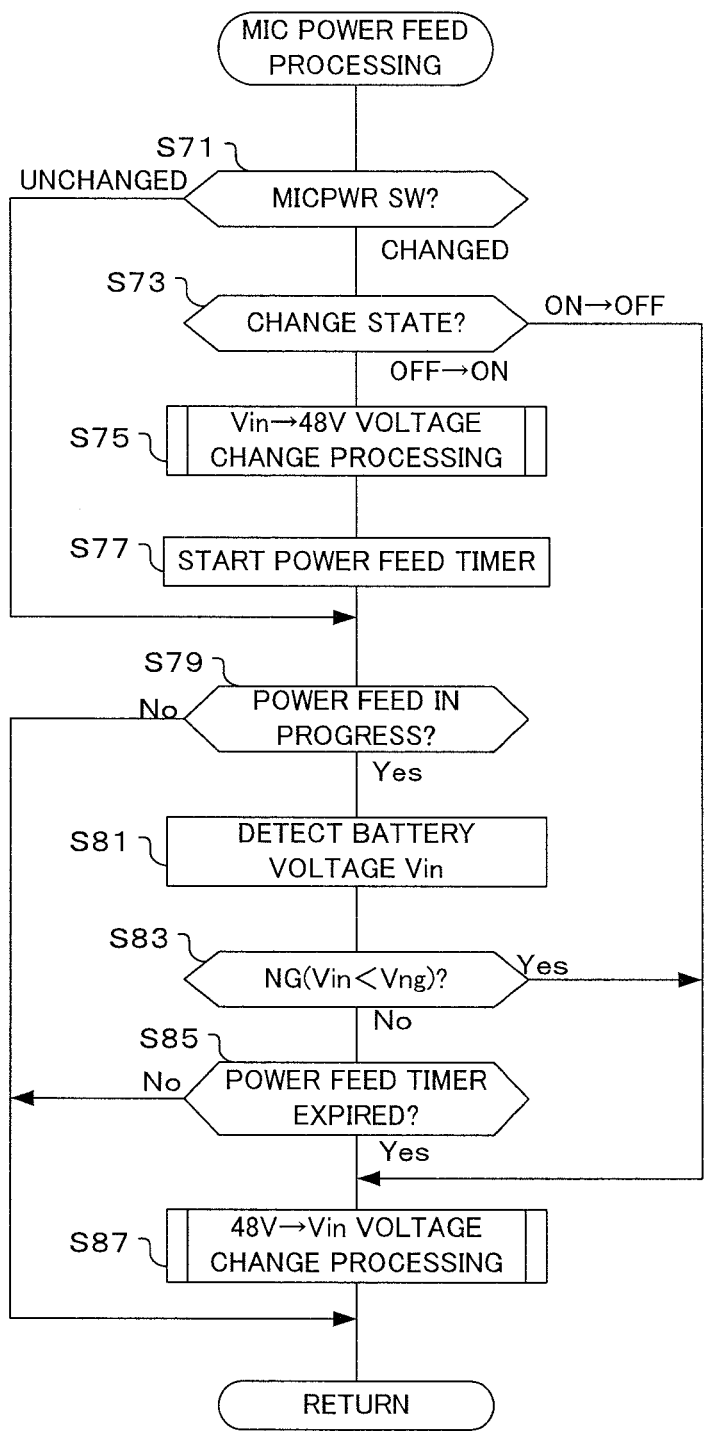
FIG. 6 is a flowchart showing operation of microphone power feed processing of the IC recorder of one embodiment of the present invention.

Next, the mic power feed processing of step S37 (refer to FIG. 4) will be described using the flowchart shown in FIG. 6 and with reference to FIG. 2-FIG. 4.

If mic power feed processing has been commenced, it is first determined whether or not the state of the external mic switching switch (MICPWR SW) has changed (S71). Here determination is based on a detection signal representing the operating state of the external mic switching switch from the operating section 31.

If the result of determination in step S71 is that state of the external mic switching switch has changed, it is next determined whether or not the operating state changed from on to off, or from off to on (S73). If the result of this determination is from off to on, voltage change processing to boost the battery voltage Vin to 48V is executed (S75). Here, since the external mic switching switch has changed from off to on, and the external mic (mic 20) is put in an operating state, and boost of the battery voltage to 48V commences. The boost operation here is gradual change of a power feed voltage Vout until it reaches 48V by means of the boost circuit 41 and D/A converter 43 etc. Details of this processing will be described later using FIG. 7.

Once voltage change processing has been carried out, next, a power feed timer is started (S77). Once power feed to the external mic has been carried out, battery consumption progresses rapidly and so in this embodiment mic power feed is only permitted during a specified time determined in step S85. In this step, a power feed timer for measuring the mic power feed time is started.

Once the power feed timer has been started, it is next determined whether or not power feed is in progress (S79). Processing for power feed to the external mic starts in previously described step S75 and stops automatically when 48V is reached (referred to S99 in FIG. 7), and mic power feed is stopped in the case where a specified time has elapsed in step S85, which will be described later, or the case of less than a determination voltage Vng in step S83. In this step, it is determined whether or not a power feed operation is being executed without the above described conditions being satisfied.

If the result of determination in step S79 is that power feed is in progress, battery voltage Vin is next detected (S81). Since battery consumption progresses rapidly during power feed, battery check is carried out regularly. If battery voltage Vin has been detected by an A/D converter, not shown, built into the system control section 29 (CPU 44), then it is next determined whether or not the battery voltage Vin is lower than a battery check NG determination voltage Vng (Vin<Vng) (S83). If the battery voltage is lower than the battery check NG determination voltage Vng, even if boost for external mic power feed has been carried out, then since the battery voltage will be lowered by battery consumption, or the boost operation itself has encountered problems, the power feed operations is stopped.

If the result of determination in step S83 is that the battery voltage Vin is higher than the battery check NG determination voltage Vng, it is next determined whether or not the power feed timer has expired (S85). Here it is determined whether or not the power feed timer that was started in step S77 described above has reached a specified time. If the result of this determination is that the power feed timer has not expired, processing returns to the originating flow.

If the result of determination in step S73 was that the external mic switching switch (MICPWR SW) was switched from on to off, or if the result of determination in step S83 was that the battery voltage Vin was lower than the battery check NG determination voltage Vng, or if the result of determination in step S85 was that the power feed timer has expired, then next voltage change processing is carried out to reduce the power feed voltage Vout to the battery voltage Vin (S87). Here, if the external mic switching switch has been switched off, use of the external mic (mic 20) is stopped, and so voltage change processing is carried out in order to stop power feed to the external mic. Also, if reduced to lower than the battery check NG determination voltage Vng, then since the battery voltage will be lowered by battery consumption, or the boost operation itself has encountered problems, the power feed operation is stopped. Also, if the power feed timer has expired voltage change processing is carried out in order to prevent battery consumption.

Voltage change processing to reduce the power feed voltage Vout to the battery voltage Vin in step S87 is gradual change of the power feed voltage Vout from 48V to the battery voltage Vin by the boost circuit 41 and the D/A converter 43 etc. Details of this processing will be described later using FIG. 8.

Once voltage change processing to Vin has been carried out in step S87, or if the result of determination in step S85 was that the power feed timer has expired, or if the result of determination in step S79 is that power feed is not in progress, the originating flow is returned to.

Figure 7:
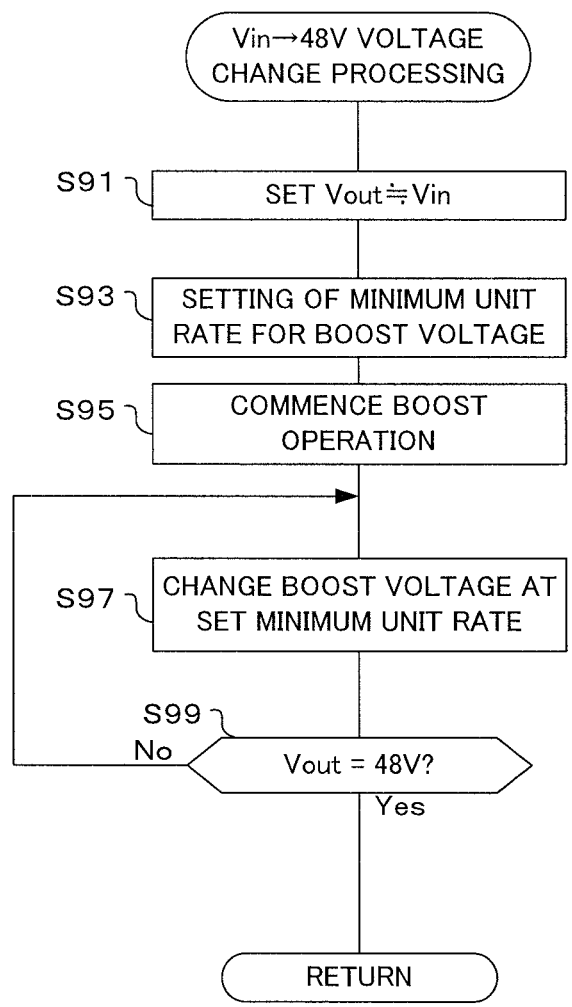
FIG. 7 is a flowchart showing operation of Vin→48V voltage conversion processing of the IC recorder of one embodiment of the present invention.

Next, operation of the voltage change processing from Vin to 48V, of step S75 (refer to FIG. 6) will be described using the flowchart shown in FIG. 7 and with reference to FIG. 2 and FIG. 3.

Once voltage change processing from Vin to 48V has been commenced, first substantially the battery voltage Vin is set as the power feed voltage Vout (S91). Here, the battery voltage Vin is written as an initial value to the D/A converter 43, and made the boost start voltage (Vout≈Vin). The initial value written to the D/A converter 43 is made a value close to the battery voltage Vin, depending on the number of bits of the D/A converter 43.

Continuing on, minimum unit rate for the boost voltage is set (S93). Here, a minimum unit rate for a required time to reach the boost target voltage (Vout=48V) from the boost start voltage (Vout≈Vin) is set. Specifically, a value of the D/A converter 43 to be increased every minimum time is set. If minimum unit rate for boost voltage has been set, then next the boost operation is commenced (S95). Here, a boost operation for the battery voltage Vin by the D/A converter 43 and boost circuit 41 etc. is commenced.

Next, a boost voltage is changed at the set minimum unit rate (S97). Here, in the boost operation, the output voltage of the D/A converter 43 and the power feed voltage Vout have an inversely proportional relationship. Specifically, as the output voltage of the D/A converter 43 is reduced, the power feed voltage Vout rises. As described above, with this embodiment, if 0.3V/LSB (minimum unit voltage) is subjected to variable control at 14 ms/LSB (minimum unit rate), for example, the boost target voltage is reached (Vout=48V) with about 2 seconds as the required time.

If the boost voltage is subject to change at the set minimum unit rate, it is next determined whether or not the power feed voltage Vout has reached the target boost voltage 48V (S99). If the result of this determination is that the target boost voltage has not been reached, step S97 is returned to and the boost operation continues. On the other hand, if the target boost voltage has been reached the originating flow is returned to.

FIG. 10A is a time chart showing variation in output of power feed voltage Vout when executing voltage change processing from Vin to 48V. If the minimum unit rate is different, the power feed voltage Vout will rise with a different curve. For example, in the case of the curve 100 for a large minimum unit rate, 48V, which is the target boost voltage, is reached at time T1, while in the case of a curve 102 for a small minimum unit rate the target boost voltage is reached at time T2. Accordingly, since the time to reach the target boost voltage is changed by changing the minimum unit rate, the minimum unit rate may be appropriately set taking into consideration characteristics of the mic amp 21 etc.

Figure 8:
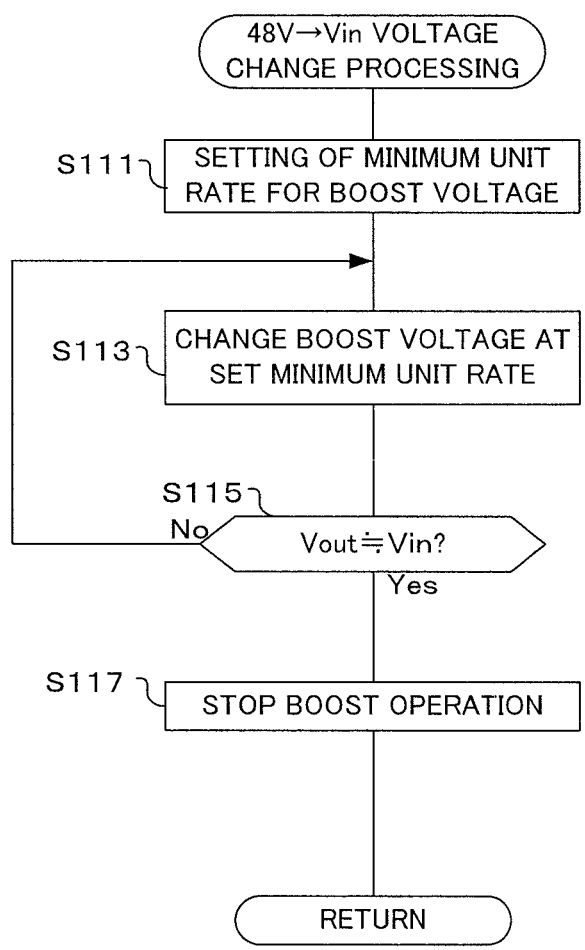
FIG. 8 is a flowchart showing operation of 48V→Vin voltage conversion processing of the IC recorder of one embodiment of the present invention.

Next, operation of the voltage change processing from 48V to Vin of step S87 (refer to FIG. 6) will be described using the flowchart shown in FIG. 8 and with reference to FIG. 2 and FIG. 3. If voltage change processing from 48V to Vin is commenced, first, setting of a minimum unit rate for boost voltage is carried out (S111). With the voltage change processing from Vin to 48V that was shown in FIG. 7, boosting was carried out from the battery voltage Vin to 48V which was the boost target voltage, but in FIG. 8 the power feed voltage Vout is lowered from the start voltage 48V to the battery voltage Vin which is made the target. In this step, a minimum unit rate for a required time to reach the target voltage (Vout≈Vin) from the start voltage (Vout=48V) is set.

The boost voltage is then changed at the set minimum unit rate (S113). Here, the power feed voltage Vout is gradually lowered by the boost circuit 41 and the D/A converter 43 etc. to the battery voltage Vin, which is the target, at the minimum unit rate that was set in step S111. As shown in FIG. 10A, in the case of the curve 100 for when the set minimum unit rate is large, the voltage is lowered to the battery voltage Vin comparatively quickly, and in the case of the curve 102 for when the set minimum unit rate is small, lowering to the battery voltage Vin takes time compared to the case of the curve 100.

Next, it is determined whether or not the power feed voltage Vout is substantially equal to the battery voltage Vin, which is the target (Vout≈Vin) (S115). If the result of this determination is that the power feed voltage Vout has not reached the target of the battery voltage Vin, step S113 is returned to and the power feed voltage Vout is lowered by the minimum unit rate. On the other hand, if the power feed voltage Vout has reached the target of the battery voltage Vin, the boost operation is stopped (S117) and the originating flow is returned to.

In this way, in the one embodiment of the present invention, a power feed voltage Vout supplied to a mic preamp 21 is either increased or decreased continuously to a target voltage at substantially constant time intervals. As a result, it is possible to suppress the superimposition of transient response voltages on an external mic, and it is possible to improve recording quality.

Figure 9:
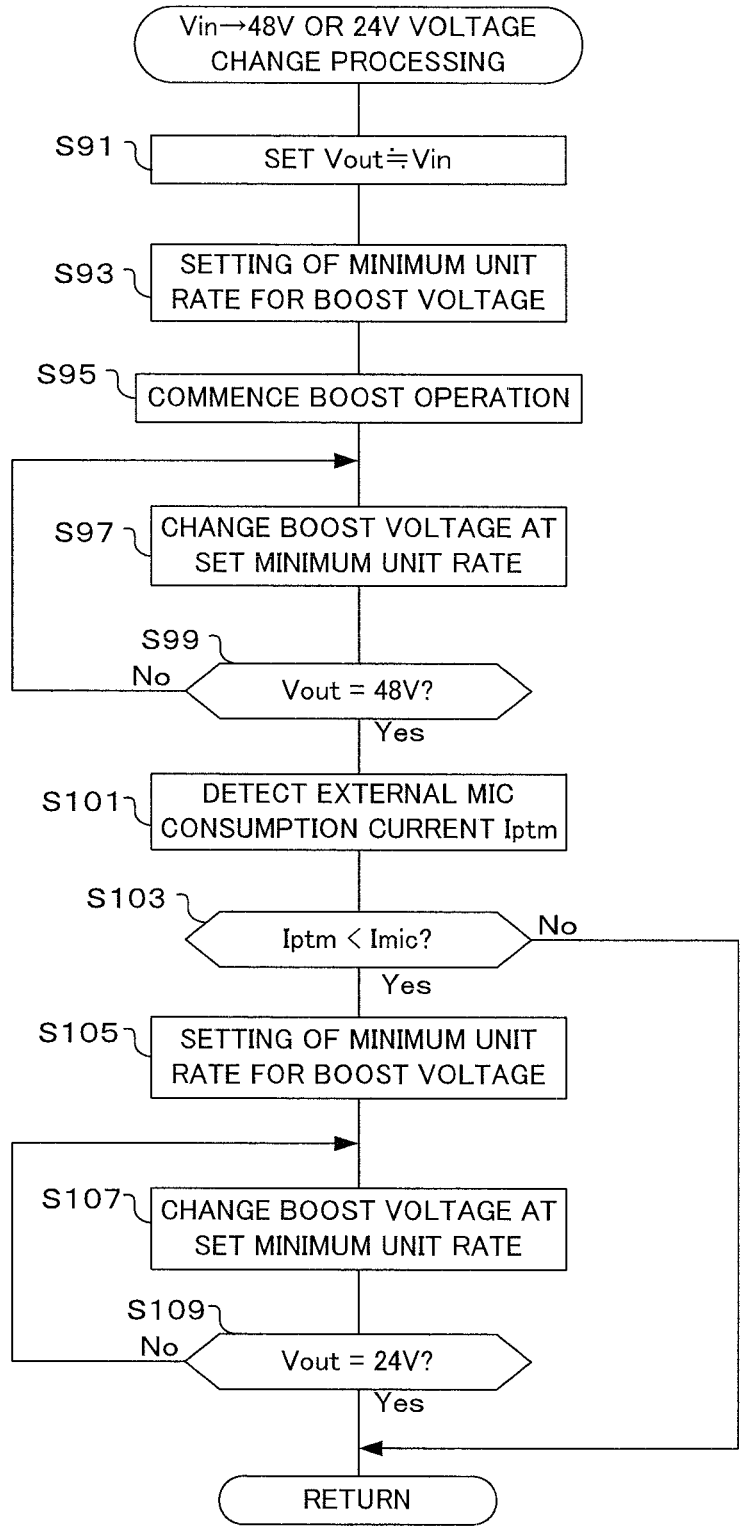
FIG. 9 is a flowchart showing operation of Vin→48V or 24V voltage conversion processing of an IC recorder of a first modified example of one embodiment of the present invention.

Next, a first modified example of flow of voltage change processing from Vin to 48V of the one embodiment of the present invention shown in FIG. 7 will be described using the flow for voltage change processing from Vin to 48V or 24V that is shown in FIG. 9. This modified example is switching of a boost voltage, which is a target, to 48V or 24V depending on the type of external mic 47 (mic 20) in the flow of FIG. 7. Specifically, consumption current will be large or small depending on the external mic 47, and with an external mic 47 of small consumption current it is sufficient for the power feed voltage Vout to be 24V. With this modified example, therefore, steps S101-S109 are added to the flow shown in FIG. 7. As a result, description for steps S91-S99 has been omitted, and description will be given for the added steps S101-S109.

If the result of determination in step S99 is that the power feed voltage Vout has reached the target of 48V, then next the external mic consumption current Iptm is detected (S101). This detection is detection of the consumption current Iptm of the external mic 47 (external mic 20) by the output current detection circuit 42 that is connected to a latter stage of the boost circuit 41. Specifically, as will be understood from FIG. 3, the consumption current Iptm of the external mic 47 is the same as the current flowing in the diode Dptm and the low pass filter circuit 45 inside the power feed distribution circuit 46, and this current is output from the output current detection circuit 42. Accordingly, it is possible to detect the consumption current Iptm of the external mic 47 using the output current detection circuit 42.

If the consumption current Iptm of the external mic has been detected, it is next determined whether or not the detected consumption current Iptm is smaller than a determination current Imic (Iptm<Imic) (S103). This determination current Imic may be set to a level that makes it possible to determine whether 48V is appropriate or 24V is appropriate, as the power feed voltage Vout of the external mic 47. With this modified example it is made, for example, 7.0 mA.

If the result of determination in step S103 is that the external mic consumption current Iptm is larger than the determination current Imic, then 48V is appropriate as the power feed voltage Vout, and so voltage change processing is completed and the originating flow is returned to.

On the other hand, if the result of determination in step S103 is that the external mic consumption current Iptm is smaller than the determination current Imic, then next setting of minimum unit rate for boost voltage is carried out (S105). Since the external mic consumption current Iptm is smaller than the determination current Imic, a 24V system is switched to taking into consideration power consumption control of the phantom power supply boost circuit 40. This switching is carried out using a signal CNTptmL for controlling FET1 and FET2 within the power feed distribution circuit 46, and a signal CNTptmR for controlling FET3 and FET4. The minimum unit rate for required time to reach the boost target voltage (Vout=24V) at this time can use the minimum unit rate that was set in step S93 directly, or a new minimum unit rate may be set and the required time to reach the boost target voltage changed. Changing output of Vout at this time is shown on curve 108 of FIG. 10B that will be described later.

If the minimum unit rate has been set, then similarly to step S97, the boost voltage is changed at the set minimum unit rate (S107). However, in step S97 there was a voltage boost from battery voltage Vin to the target of 48V, but in this step S107 there is a gradual lowering of the boost voltage from 48V towards 24V.

If the boost voltage has been changed in step S107, it is next determined whether or not the power feed voltage Vout has reached 24V (S109). If the result of this determination is that 24V has not been reached, step S107 is returned to and the boost voltage is gradually lowered. On the other hand, if the result of determination is that the power feed voltage Vout has reached 24V, voltage change processing is completed and the originating flow is returned to.

Figure 11:
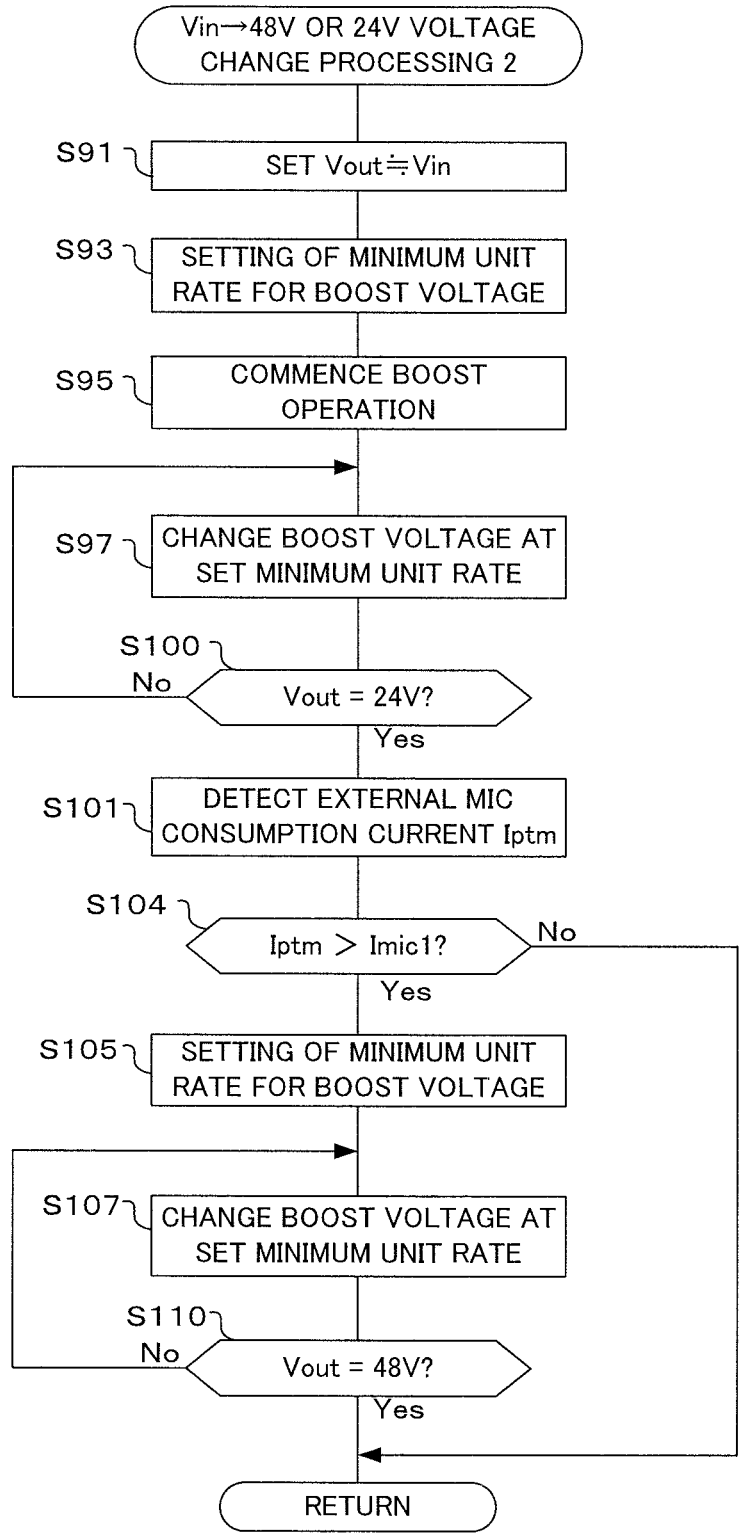
FIG. 11 is a flowchart showing operation of Vin→48V or 24V voltage conversion processing 2 of an IC recorder relating to a second modified example of one embodiment of the present invention.

Next, a second modified example of flow of voltage change processing from Vin to 48V or 24V of the one embodiment of the present invention shown in FIG. 9 will be described using the flow for voltage change processing 2 from Vin to 48V or 24V that is shown in FIG. 11. With this modified example, the only difference from the flow shown in FIG. 9 is that step S99 is replaced with S100, S103 is replaced with S104, and S109 is replaced with S110. As a result, description for steps S91-S97 has been omitted, and description will center on the replaced steps. With this modified example, initially setting to a 24V system is carried out using a signal CNTptmL for controlling FET1 and FET2 within the power feed distribution circuit 46, and a signal CNTptmR for controlling FET3 and FET4.

If the boost voltage has been changed in step S97, it is next determined whether or not the power feed voltage Vout has reached 24V (S100). If the result of this determination is that power feed voltage has not reached 24V, step S97 is returned to and the boost voltage is changed.

If the result of determination in step S100 is that the power feed voltage Vout has reached 24V, next the external mic consumption current Iptm is detected (S101), and it is determined whether or not this detected external mic consumption current Iptm is larger than a determination current Imic1 (Iptm>Imic1) (S104). The determination current Imic1 may have the same value as the previously described determination current Imic, or, since the consumption current Iptm is determined with the power feed voltage Vout in a 24V state, may be set to a current value that is smaller than Imic, depending on the power feed voltage.

If the result of determination in step S104 is that the external mic consumption current Iptm is smaller than the determination current Imic1, then since 24V is appropriate as the power feed voltage Vout, voltage change processing is completed and the originating flow is returned to.

On the other hand, if the result of determination in step S104 is that the external mic consumption current Iptm is larger than the determination current Imic1, then next setting of minimum unit rate for boost voltage is carried out (S105). Since the external mic consumption current Iptm is larger than the determination current Imic1, a 48V system is switched to using the signal CNTptmL for controlling FET1 and FET2 within the power feed distribution circuit 46, and the signal CNTptmR for controlling FET3 and FET4. The minimum unit rate for required time to reach the boost target voltage (Vout=48V) at this time can use the minimum unit rate that was set in step S93 directly, or a new minimum unit rate may be set and the required time to reach the boost target voltage changed.

If the boost voltage has been changed in step S107, it is next determined whether or not the power feed voltage Vout has reached 48V (S110). If the result of this determination is that 48V has not been reached, step S107 is returned to and the boost voltage is gradually raised. On the other hand, if the result of determination is that the power feed voltage Vout has reached 48V, voltage change processing is completed and the originating flow is returned to.

FIG. 10B is a time chart showing variation in output of power feed voltage Vout when executing voltage change processing from Vin to 48V or 24V. Power feed voltage Vout is different depending on the external mic consumption current Iptm. For example in the case where consumption current Iptm is larger than the determination current Imic, power feed voltage Vout is set to 48V as in curve 104, while on the other hand if consumption current Iptm is smaller than the determination current Imic the power feed voltage Vout is set to 24V as in the curve 108.

FIG. 10B also shows output variation for power feed voltage Vout when the voltage change processing 2 from Vin to 48V or 24V shown in FIG. 11 is executed. For example, if consumption current Iptm is larger than the determination current Imic1, the power feed voltage is set to 48V as in curve 104, while on the other hand if consumption current Iptm is smaller than the determination current Imic1 the power feed voltage is set to 24V as in curve 106. With the example shown in FIG. 10B, the minimum unit rate is made the same regardless of the consumption current Iptm, but it can also be made different.

In this manner, with the first and second modified examples the power feed voltage Vout fed to the external mic is switched depending on the consumption current of the external mic. If described using the functional block diagram shown in FIG. 1, the output current detection section 2 detects output current that is output from the boost section 1 to the power feed section 5, and more specifically the output current detection section 2 detects current that is circulating in the boost section 1 by means of the power feed section 5, balanced transmission line BW, and audio input section 6. Also, the control section 4 controls rate of increase or rate of decrease of the output voltage of the boost section 1 by controlling the output voltage changing section 3 based on output of the output current detection section 2. Specifically, at the time of power feed to the audio input section 6, the control section 4, based on current detected in the output current detection section 2, selects power feed voltage Vout from among a plurality of power feed voltages such that power consumption of the boost section 1 becomes minimum, and outputs a control signal to the output voltage changing section 3. As a result, it is possible to optimize power consumption at the time of recording, and prevent battery draining.

With the first and second modified examples, a phantom power supply boost circuit 40 is switched to a 48V system or a 24V system depending on an external mic, but these voltage systems are not limiting, and it is also possible to set a voltage system in accordance with characteristics of the external mic.

Also, with the first and second modified examples there are 2 types of voltage system, but is also possible to have 3 or more voltage systems. Further, detection of the external mic is carried out by detecting consumption current of the external mic, but this is not limiting and it is also possible, for example, to carry out data communication with the external mic, to acquire the type of the external mic.

As has been described above, with the one embodiment of the present invention and the modified examples, power feed voltage of a power feed section is controlled by controlling a power feed section 4 that carries out power feed to an audio input section by means of a balanced transmission line, and an output voltage changing section for variable control of an output voltage of a boost section. It is therefore possible to control variation over time of a power feed voltage when carrying out power feed to an audio input section, and as a result it is possible to suppress the occurrence of transient response voltages.

In the one embodiment and the modified examples of the present invention, increase or decrease of a power feed voltage by a D/A converter is carried out at every fixed time interval, but this is not limiting and it is also possible to vary the fixed interval with the increase or decrease of the power feed voltage made constant. Also, description has been given for the power feed voltage of 48V or a combination of 48V and 24V, but other voltages are also possible, and it is also possible to use a combination of 3 or more voltages.

Also, the one embodiment and modified examples of the present invention have been described using an IC recorder as an audio recording and playback device, but as well as an IC recorder is also possible to use an audio recording and playback device that is integrated with a mobile telephone or mobile information terminal (PDA: personal digital assistant) or game device etc.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An audio recording and playback device, capable of recording and playing back audio, comprising:
    an audio input section for converting audio input during an audio recording operation into an electrical audio signal;
    a power feed section for carrying out power feed to the audio input section by means of a balanced transmission line;
    an amplifier section for amplifying the audio signal;
    a boost section for generating a power feed voltage to be applied to the balanced transmission line and outputting to the power feed section;
    an output current detection section for detecting output current output by the boost section to the power feed section;
    an output voltage changing section for carrying out control to vary the output voltage of the boost section; and
    a control section for controlling the power feed voltage of the power feed section by controlling the power feed section and the output voltage changing section,
    wherein the control section controls the output voltage changing section, based on output of the output current detection section, to bring the output voltage of the boost section to a specified target voltage, and outputting to the power feed section, and
    wherein the control section, when the output of the output current detection section is larger than a specified value, in a state where a first target voltage has been set and the output voltage of the boost section has been brought to the first target voltage, sets the output voltage of the boost section to a second target voltage that is higher than the first target voltage.

2. The voice recording and playback device of claim 1, wherein:
    the control section, in a case where output of the output current detection section is smaller that a specified value in a state where the second target voltage is set and output voltage of the boost section has been brought to the second target voltage, sets the output voltage of the boost section to a third target voltage that is lower than the second target voltage.

3. The audio recording and playback device of claim 1, wherein:
the control section controls the output voltage changing section to bring the output voltage of the boost section to a specified target voltage by increasing or reducing by a specified voltage every fixed interval a specified number of times, and outputting to the power feed section.

4. The audio recording and playback device of claim 3, wherein:
the control section changes a required time until the specified target voltage is reached by changing the fixed interval.

5. The audio recording and playback device of claim 3, wherein:
the control section changes a required time until the specified target voltage is reached by changing the specified voltage.

6. The audio recording and playback device of claim 1, further comprising:
an operation section, that is operated from outside, for outputting instructions to the control section in accordance with operation content, and wherein
the control section, when there has been an instruction to operate or stop the audio input section from the operation section, controls the output voltage changing section to control the output voltage of the boost section, and outputs to the power feed section.

7. The audio recording and playback device of claim 6, wherein:
the control section, when there has been an instruction to operate the audio input section from the operation section, controls the output voltage changing section to control the output voltage of the boost section to increase, and outputs a specified target voltage to the power feed section.

8. The audio recording and playback device of claim 6 wherein:
the control section, when there has been an instruction to stop the audio input section from the operation section, controls the output voltage changing section to control the output voltage of the boost section to reduce, and outputs a specified target voltage to the power feed section.

9. The audio recording and playback device of claim 1, wherein:
the control section, when an audio recording operation is in progress, prohibits an operation to change output voltage to the power feed section by the output voltage changing section.

10. The audio recording and playback device of claim 1 wherein the first target voltage is a first predetermined value and the second target voltage is a second predetermined value, and
wherein responsive to a determination that the output voltage of the boost section has been brought to the first target voltage,
(1) the control section determines whether or not a consumption current of the audio input section is larger than a predetermined current value, and
(2) responsive to a determination that the consumption current of the audio input section is larger than the predetermined current value, the control section sets the output voltage of the boost section to the second target voltage, and
otherwise, responsive to a determination that the consumption current of the audio input section is not larger than the predetermined current value, the control section maintains the output voltage of the boost section at the first target voltage.

11. The audio recording and playback device of claim 10 wherein the first target voltage is 24V and the second target voltage is 48V.

12. The audio recording and playback device of claim 11, wherein the predetermined current value is 7 mA.

13. The audio recording and playback device of claim 10 wherein the predetermined current value is set to a level that makes it possible to determine whether the first target voltage is appropriate or the second target voltage is appropriate.

14. The audio recording and playback device of claim 1 wherein the output current output by the boost section to the power feed section and detected output current detection section corresponds to a consumption current of the audio input section.

15. A power feed method to an audio input section of an audio recording and playback device that comprises a power feed section for carrying out power feed to an audio input section via a balanced transmission line, and a boost section for generating a power feed voltage to be applied to the balanced transmission line and outputting to the power feed section, comprising
bringing the output voltage of the boost section to a specified target voltage by increasing or reducing by a specified voltage every fixed interval a specified number of times, based on output current from the boost section to the power feed section, and outputting to the power feed section; and
when the output current is larger than a specified value, in a state where a first target voltage has been set and the output voltage of the boost section matches the first target voltage, setting the output voltage of the boost section to a second target voltage that is higher than the first target voltage.

16. The power feed method of claim 15 wherein the first target voltage is a first predetermined value and the second target voltage is a second predetermined value, and
wherein responsive to a determination that the output voltage of the boost section has been brought to the first target voltage,
(1) determining whether or not a consumption current of the audio input section is larger than a predetermined current value, and
(2) responsive to a determination that the consumption current of the audio input section is larger than the predetermined current value, setting the output voltage of the boost section to the second target voltage, and
otherwise, responsive to a determination that the consumption current of the audio input section is not larger than the predetermined current value, maintaining the output voltage of the boost section at the first target voltage.

17. The power feed method of claim 16 wherein the first target voltage is 24V and the second target voltage is 48V.

18. The power feed method of claim 17, wherein the predetermined current value is 7 mA.

19. The power feed method of claim 16 wherein the predetermined current value is set to a level that makes it possible to determine whether the first target voltage is appropriate or the second target voltage is appropriate.

20. The power feed method of claim 15 wherein the output current from the boost section to the power feed section corresponds to a consumption current of the audio input section.

* * * * *